United States Patent [19]

Kim et al.

[11] Patent Number: 4,761,770
[45] Date of Patent: Aug. 2, 1988

[54] ULTRASONIC BINAURAL SENSORY AID FOR A BLIND PERSON

[76] Inventors: Wonky Kim, 263 Chagchun-dong, Suhdaemoon-ku; Taeyoung Choi, 17-6 Shinchun-dong, Kangdong-ku, both of Seoul, Rep. of Korea

[21] Appl. No.: 92,370

[22] Filed: Sep. 2, 1987

[30] Foreign Application Priority Data

Sep. 15, 1986 [KR] Rep. of Korea .................. 86-7760

[51] Int. Cl.$^4$ ............................................. G01S 9/68
[52] U.S. Cl. ........................................ 367/116; 367/99; 367/910
[58] Field of Search ............... 367/98, 99, 116, 900, 367/910; 342/24, 156; 381/29, 31, 33, 34

[56] References Cited

U.S. PATENT DOCUMENTS

| | | | |
|---|---|---|---|
| 3,366,922 | 1/1968 | Kay | 367/910 |
| 3,618,007 | 11/1971 | Anderson | 367/900 |
| 4,041,441 | 8/1977 | Johnson | 367/910 |
| 4,349,896 | 9/1982 | Hall, Jr. | 367/98 |

Primary Examiner—Thomas H. Tarcza
Assistant Examiner—Daniel T. Pihulic
Attorney, Agent, or Firm—Watson, Cole et al.

[57] ABSTRACT

A method for processing a reflected echo signal which is received from an object and supplied to an ultrasonic binaural sensory aid comprising the step of stretching said reflected signal in time axis, and the step of converting the stretched signal into a signal of audible frequency, and a blind aid which works by the above mentioned method.

10 Claims, 5 Drawing Sheets

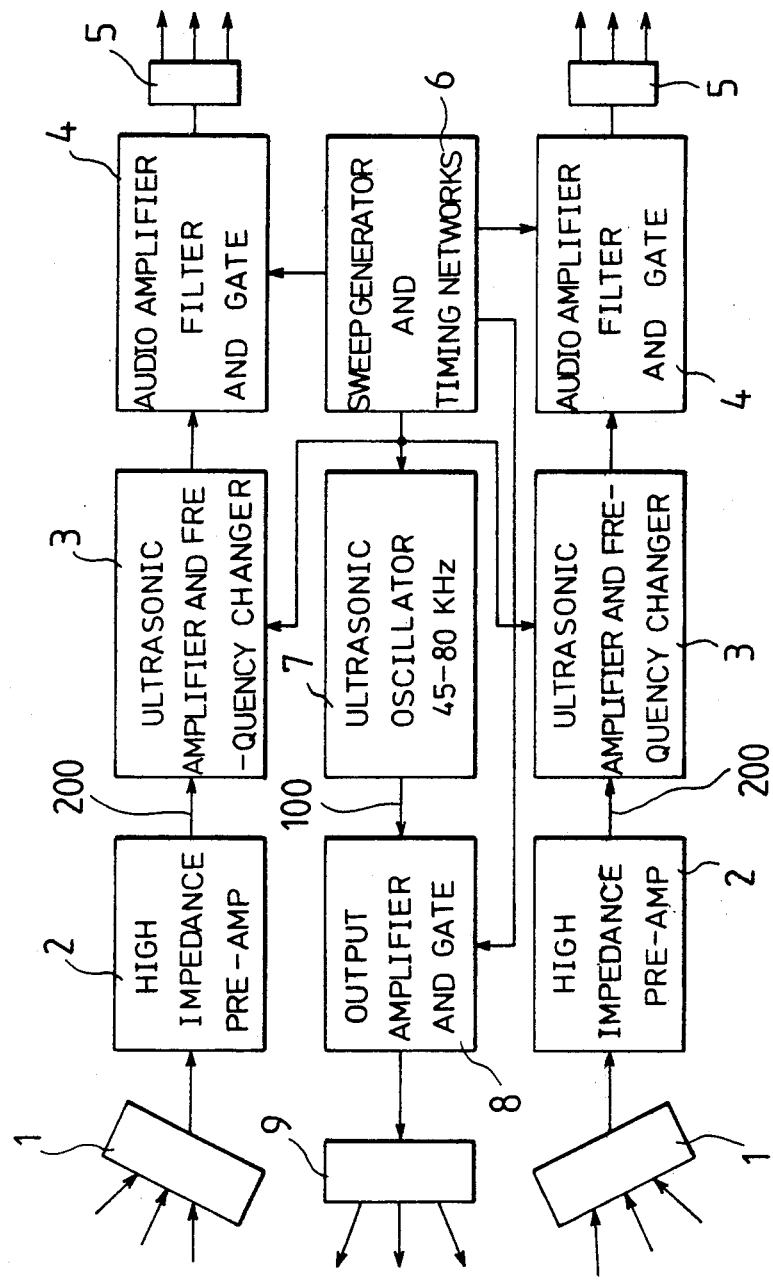

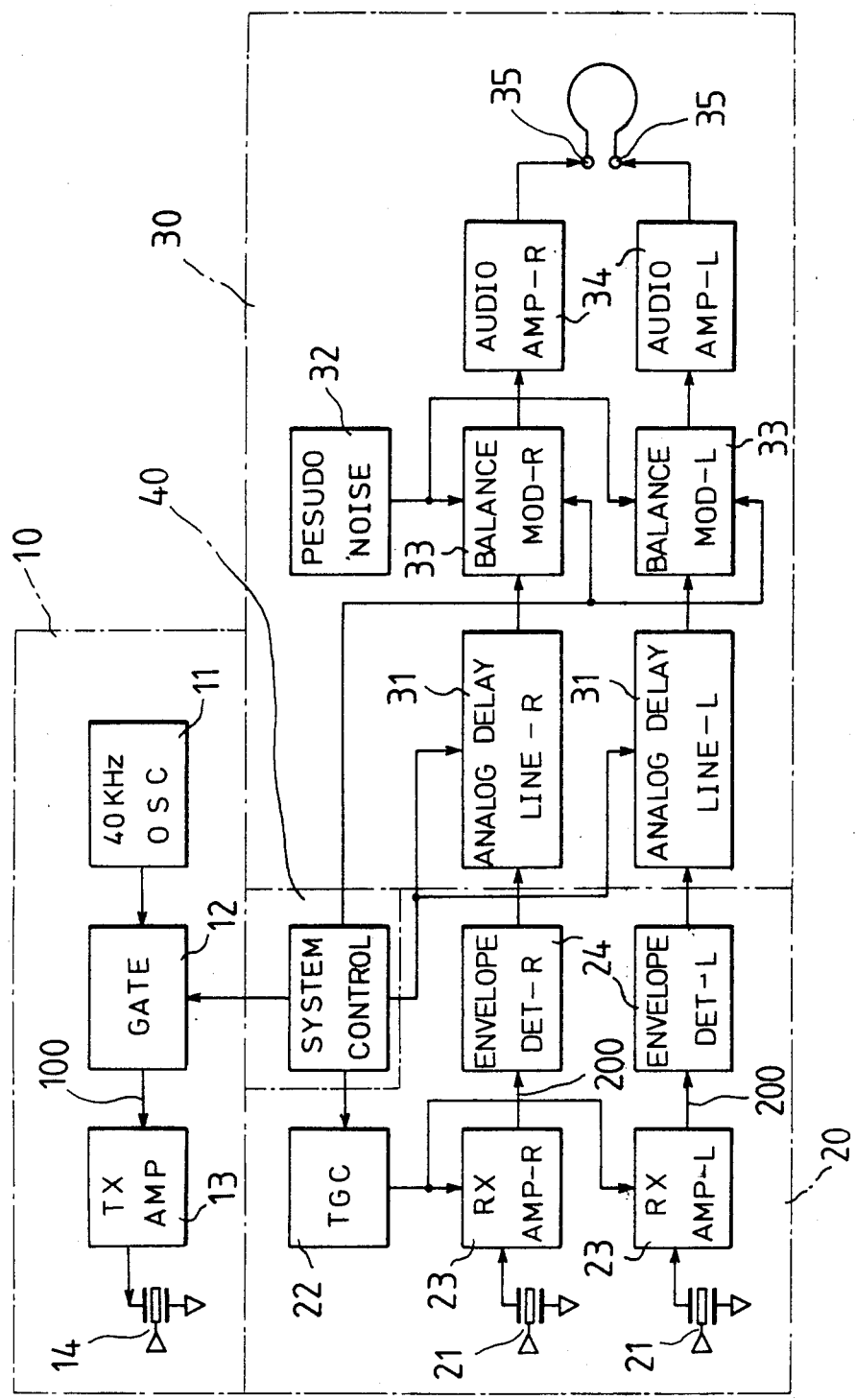

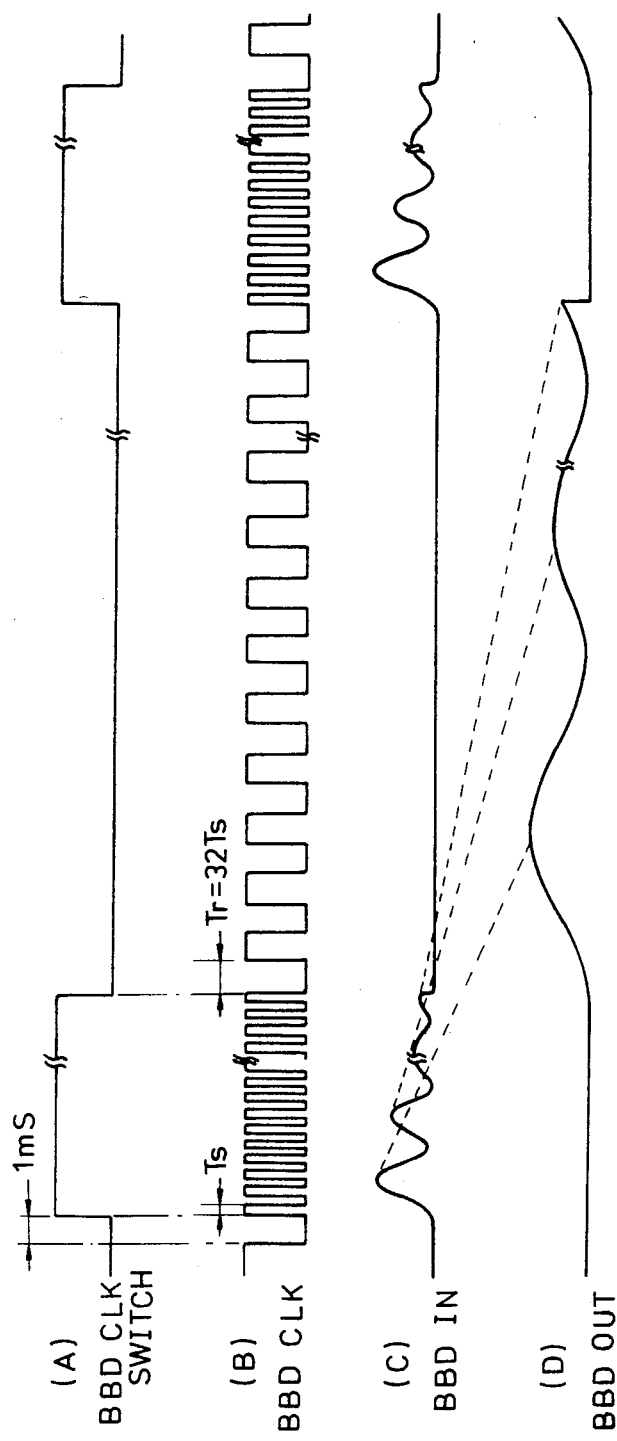

ULTRASONIC BINAURAL SENSORY AID FOR A BLIND PERSON

FIELD OF THE INVENTION

The present invention relates to an ultrasonic binaural sensory aid for a blind person, and more particularly to a method and apparatus for processing the reflected echo signal of the ultrasound radiated to an object in the field of view in order that a blind senses the hardness, position and shape of an object in said field and can walk by oneself without a guide or a cane.

BACKGROUND OF THE INVENTION

A normal human auditory system can not discriminate the time difference for the transmitted signal of a transmitting transducer to travel out to an object and back again by way of a receiving transducer, since the ultrasonic signal is propagated at the speed of about 340 meters per second, the relevant time difference is several milliseconds and the frequency of the ultrasound signal is beyond the human audible range.

Accordingly, the reflected echo signal which is received from an object in the field of view has to be converted into an audible frequency in order that a blind person can discriminate the echo signal.

In the prior art signal processing method disclosed in U.S. Pat. No. 3,366,922, the sonic aid for a blind has utilized a method that processes a reflected echo signal corresponding to an audible frequency proportional to the time delay of said echo signal. For example, it takes about 6 msec time delay for the transmitted ultrasound to travel out to an object located one meter ahead and back again. It is because, in such a case, a person cannot sense the reflected echo signal at such a time delay. The prior art signal processing method has converted the reflected echo signal received from an object which is located one meter ahead into an audible frequency of 1000 Hz in succession, and has converted the echo signal received two meters ahead into an audible frequency of 2000 Hz in succession, and has thereby detected the position of an object. Therefore, the prior art signal processing method has been defective in that, with such manner of converting successively the reflected echo signal comprising the time difference proportional to the range of an object into an audible frequency, it is hard for a blind person to discriminate respectively the position of the objects due to the successively incoming mixed signal received from one and other objects, and has also been defective in that, since the audible frequency varies in accordance with the several positions even in the same object, it is hard for a blind person to recognize the object. And the conventional blind aid which is utilized in the above method has been defective in that, since the frequency discriminating capability of a human auditory system is not to provide recognition as by the absolute difference of the frequency but the relative difference of the frequency, and has also been defective in that, the transmitting transducer needs the wide band characteristics of 40 KHz to 80 KHz at which the ultrasonic oscillator generates, it does not make use of the narrow band transducer which is cheap and of good performance.

SUMMARY OF THE INVENTION

It is an object of the invention to provide a signal processing method which stretches the incoming signal in the time axis and in the order of the reflected echo signal received from an object in the field of view, and to provide a blind aid detecting a distance object as by the above method in order that a blind persons senses the position of an object.

To achieve the above mentioned object, a blind aid according to an embodiment of the present invention comprises a transmitting channel and two receiving channels, and is characterized by comprising a transmitting unit in the form of a transmitting channel for radiating an ultrasound into the space which forms the field of view; a receiving unit for amplifing and detecting the reflected echo signal from an object in the field of view; a signal processing unit for stretching a signal derived from the above receiving unit in the time axis and converting the signal into an audible frequency; and a system controlling unit for controlling the above overall system.

BRIEF DESCRIPTION OF THE DRAWINGS

The invention will now be described with reference to the accompanying drawings wherein:

FIG. 1 is a schematic block diagram of the conventional blind aid.

FIG. 2 is a schematic block diagram of the blind aid according to the present invention.

FIG. 4 is an input-output timing chart of a time stretching circuit which is included in a signal processing unit illustrated by FIG. 3(B).

DETAILED DESCRIPTION OF THE INVENTION

Figure 3A:
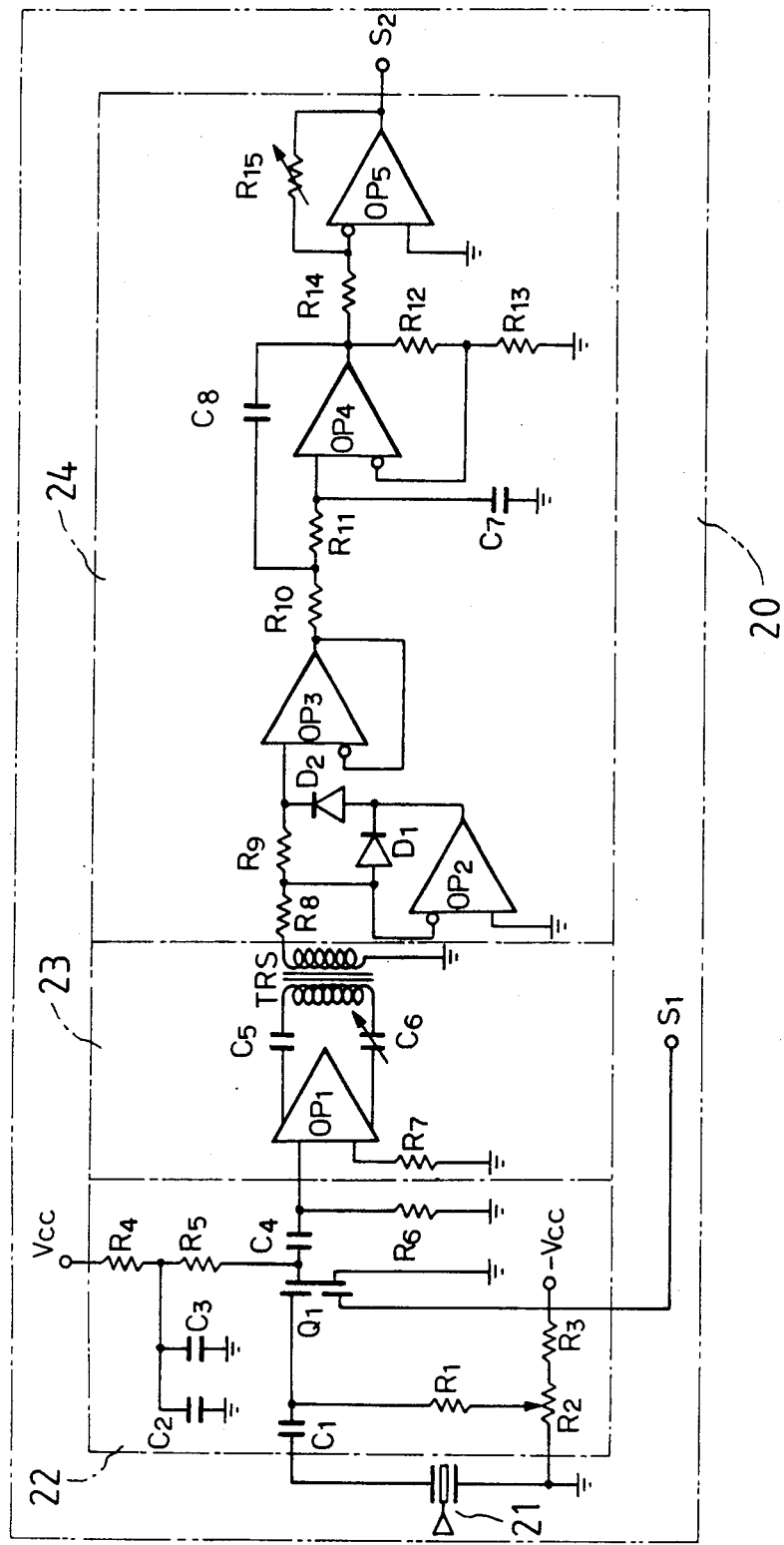
FIGS. 3(A) and 3(B) are, respectively, the detailed circuit diagrams of a receiving unit and a signal processing unit which are included in each receiving channel according to an embodiment of the present invention.

Referring to FIG. 1, there is shown a schematic block diagram of the conventional blind aid detecting a distance object in the field of view, which comprises a transmitting channel 100 and two receiving channels 200.

The transmitting channel includes the ultrasonic oscillator 7 generating a wide band ultrasound 45 KHz to 80 KHz by a signal derived from the sweep generator and timing network 6. The wide band ultrasound is fed through the output amplifier and gate 8 to the transmitting transducer 9 for radiating the ultrasound. Each of the receiving channels include the receiving transducer 1 for converting the echo signal received from an object in the field of view into an electrical signal, which is fed through the high impedance preamplifier 2 and the ultrasonic amplifier and frequency to the audible amplifier filler and gate 4.

The output of the audio amplifier filter and gate 4 as mentioned above is in an audible range, and is information as to the direction of an object in the field of view and is applied to the earphones 5.

Accordingly, a blind person who wears the above earphones 5 senses the position of an object.

Referring to FIG. 2 the blind aid there shown comprises a transmitting channel indicated generally at 100 and two receiving channels indicated generally at 200.

In FIG. 2, a transmitting channel includes the pulse generator in the form of the oscillator 11 for generating square waves of 40 KHz (of center frequency) which is fed to the gate circuit 12, in order that an ultrasonic burst signal is efficiently radiated by the transmitting transducer 14.

The output of the gate circuit 12 which is controlled in accordance with the transmitting trigger signal furnished by the system controller 40 is fed to the output amplifier 13 and thence to the transmitting transducer 14. The transmitting transducer 14 converts the generating pulse derived from the oscillator 11 into the ultrasound wave being radiated into the space which forms the field of view of the blind aid.

The blind aid according to the present invention utilizes the transmitting transducer with a center frequency of 40 KHz, and which has a narrow band of 6 KHz.

In each of the receiving channels 200, the receiving unit 20 includes the receiving transducer 21 which is converting the reflected echo signal received into the electrical signal which is fed through the receiving amplifier 23 to the envelope detector 24.

The control signal at which the system controller 40 operates is fed to the time gain control 22 along feed lines, so that the receiving amplifier 23 amplifies the echo signal derived from the receiving transducer 21.

The time gain control 22 adjusts the gain proportional to the reflected echo arrival time from an object in order to compensate the loss according to far field objects.

The the envelope detector 24 detects envelope signal of the amplified echo fed out from the receiving amplifier 23, and the frequency of the envelope signal is converted to an audible frequency.

In each of receiving channels 200 the signal processing unit 30 includes the time stretching circuit 31 which is clocked by the real time clock and which stores the envelope signal, and which is clocked by the extended time clock and which pulls out the stored analog signal.

The outputs of the time stretching circuit 31 are fed through the balance modulator 33 to the audio amplifier 34. While noise is a signal that a person can listen successively without being tired, and is furnished by the pseudo noise generator 32 and is fed to the balance modulator 33.

Here, the output of the time stretching circuit 31 is below the audible range, so that the balance modulator 33 modulates and converts the output signal into an audible frequency range using pseudo noise, which is fed to the audio amplifier 34 and thence to the earphones 35.

Accordingly, a blind person can listen to sounds applied to his ears by means of the earphones 35, and can sense the position of an object.

For example, the time delay between the transmitted signal and the echo signal reflected from an object located one meter ahead is about 6 msec, and is hard to sense. However, stretching the time delay by 32 times, it becomes 200 msec, and a person can easily sense a signal according to the stretched time delay.

The system controlling unit 40 controls the overall units as mentioned above.

As mentioned above, the oscillator 11 included in the transmitting channel generates a wave of 40 KHz, and then the gate circuit 12 adjusts the transmitting time befitting the characteristics of the transmitting transducer 14 in conformity with the transmitting trigger signal derived from the system controlling unit 40 and gates the components of the square waves.

The resulting square wave burst of 40 KHz which is furnished by the output amplifier 13 incorporating an up-transformer (not shown in the FIGUREs) is fed to the transducer 14 which radiates an ultrasound in the space which forms the field of view of the sonar aid.

The reflected echo signal received from an object in the field of view is fed to the receiving transducer 21 and is converted to an electrical signal.

Referring now to the individual units shown generally in FIG. 2, and firstly to the detailed circuit diagram of FIG. 3(A), the time gain control 22 included in a receiving unit 20 which includes the preamplifier Q1 having high impedence and easy gain controllability, two input terminals of the preamplifier Q1 are fed with the reflected echo signal through the capacitor C1 and the saw-tooth signal S1 which is furnished by the integrating circuit (not shown in FIGUREs) fed with the transmitting trigger signal derived from the system controlling unit 40, so that the preamplifier Q1 provides a signal which is compensated for the attenuation of the echo signal proportional to a distance object in the field of view and which is adjusted by the values of the capacitors C2 and C3, and resistors R4 and R5.

The receiving amplifier 23 includes the wide band amplifier OP1, the up-transformer TRS and the capacitors C5 and C6, and amplifies the output of the preamplifier Q1.

The envelope detector 24 includes the operational amplifiers OP2 and OP3, diodes D1 and D2, resistors R8 to R10.

The output of the above up-transformer TRS is fed through the resistor R8 and R9 to an operational amplifier OP3, a signal which is amplified by the above amplifier OP3 is fed to a low pass filter which comprises two operational amplifiers OP4 and OP5, resistors R10 to R15 and capacitors C7 and C8.

The output of the above amplifier OP3 is fed to the low pass filter which is also incorporated in the envelope detector 24, and then the low pass filter provides the detected envelope of the reflected echo signal.

The envelope signal S2 is above the range of the audible frequency and has to be converted to audible range, and is fed to the signal processing unit 30, hereinafter referred to in greater detail.

Figure 3B:
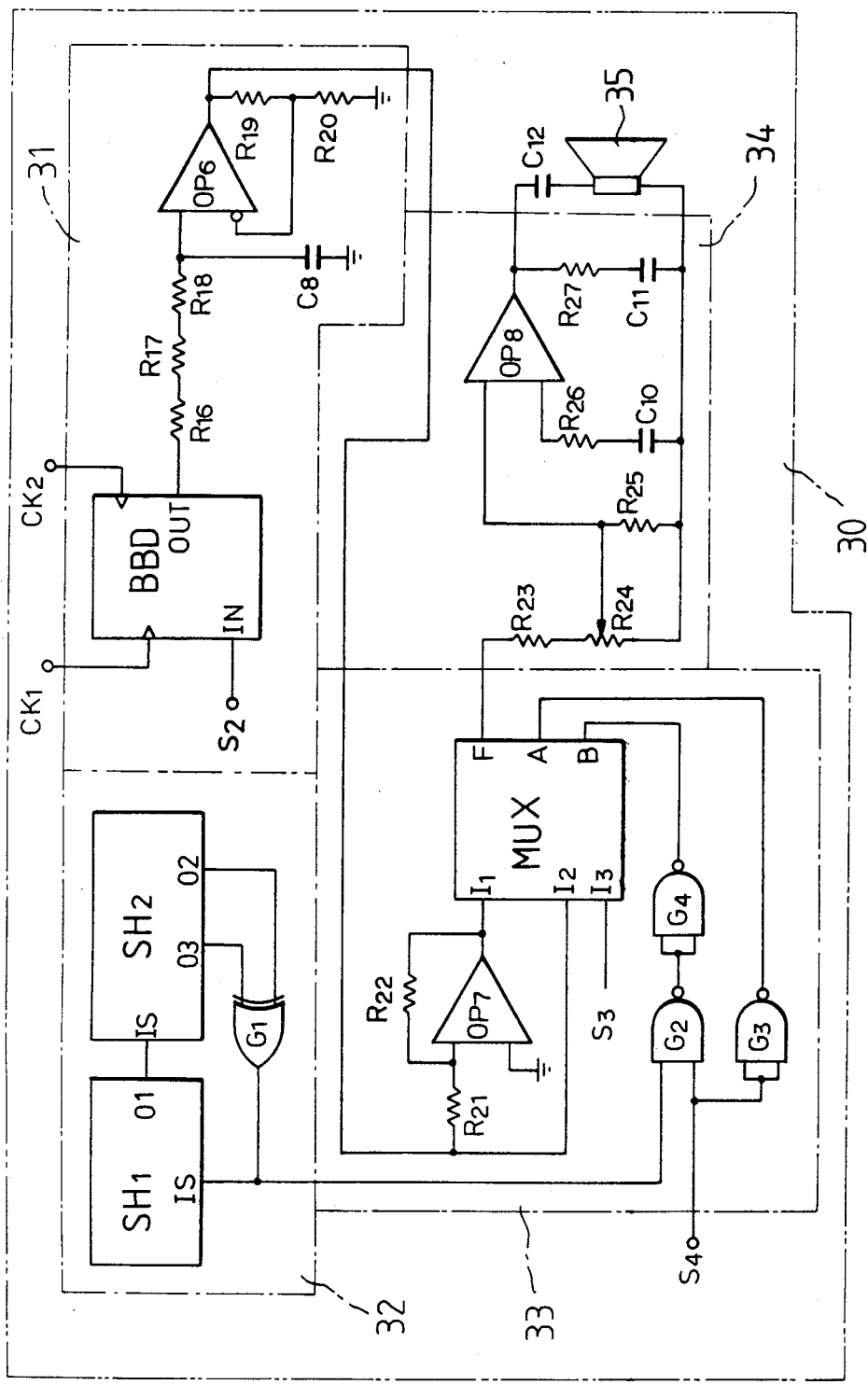

Referrence is now made to the detailed circuit diagram of the signal processing unit as illustrated in FIG. 3 (B). In FIG. 3(B) the time stretching circuit 31 includes the bucket-brigade device BBD for stretching the input signal in the time axis, the output of the above BBD is fed through the resistors R16 to R18, capacitor C8 and operational amplifier OP6 to the balance modulator 33. The envelope signal S2 is stored in the BBD in a sequential order when the real time clock CK1 is furnished by the system controller 40, the analog signal stored in the BBD provides, in the same order as the input, when the BBD is synchronized with the time extended clock CK2 which is 32 times the period of the real time clock, and is fed to the balance modulator 33.

The input and output operation of the BBD is controlled by the synchronized signals CK1 and CK2 derived from the system controlling unit 40.

Referring now to FIG. 4 showing the input and output timing chart according to the operation of the BBD, (C) is a detected envelope signal fed to an input terminal of the BBD, the envelope signal is stored in the BBD by using the real time clock as shown in (B) of FIG. 4. The time extended clock which is 32 times the period of the real time is shown in (A) of FIG. 4.

The detected envelope signal (shown in (C) of FIGURE (4) having been completely stored in the BBD by using the real time clock as shown in (B) of FIG. 4, the output terminal of the BBD provides the signal shown in (D) of FIG. 4 by using the time extended clock as shown in (A) of FIG. 4.

In (C) of FIG. 4 and (D) of FIG. 4, there are shown that the output of the BBD has stretched the input by 32 times in the time axis, so that the components of the detected envelope signal stretched in the time axis is 1/32 times of the input and is below the range of audible frequency. Accordingly, the envelope signal stretched in the time axis has to be converted into the range of audible frequency.

In FIG. 3(B) the pseudo noise generator 32 includes a shift register SH1 connected in series with a shift register SH2, and exclusive OR gate G1 fed with two outputs of the shift register SH2.

The white noise signal derived from the pseudo noise generator 32 are the components of the wide band frequency and are fed through the exclusive OR gate G1 to the balance modulator 33.

The balance modulator 33 includes the analog multiplexer MUX which is fed with a signal derived from the time stretching signal 31. The signal is passed through an amplifing circuit which consists of an operational amplifier OP7 and resistor R21 and R22, and the divided signal S3 derived from the oscillator 11.

The above multiplexer MUX is controlled with a control signal S4 which is derived from the system controlling unit 40 and which is passed through a NAND gate G3 for inverting.

The multiplexer MUX is also controlled with the output of the NAND gate G2. The NAND gate G2 which is connected in serial with the NAND gate G4 for inverting is fed with the output of the exclusive OR gate G1 and control signal S4.

Thus the analog multiplexer with the output of the envelope signal stretched in the time axis as by the white noise signal, the modulated signal is fed through the audio amplifier 34 to the earphone 35.

A blind person who wears the above earphones senses the direction of an object in the field of view, and also detects the sound direction due to the stereo receivers incorporating a receiving unit and a signal processing unit.

The present invention can enable a blind person to sense the position, direction and shape of the demensional objects, to be able to walk by oneself without a guide or a cane.

We claim:

1. A method of detecting the position of objects in an ultrasonic binaural sensory aid, comprising:
    radiating ultrasonic signals over an area comprising a field of view;
    receiving signals reflected from objects within said field of view;
    amplifying the received signals;
    detecting the envelope of the amplified signals;
    stretching the time axis of the detected envelopes; and modulating the stretched detected envelopes with pseudo noise to generate audio signals representative of said detected objects.

2. A method as set forth in claim 1, further comprising adjsuting the gain of the amplification of the received signal proportional to the reflected signal arrival time to compensate for far field objects.

3. A method as set forth in claim 1, wherein the said step of stretching includes stretching the time axis of the detected envelopes with a real time clock and a time extended clock.

4. A method as set forth in claim 1, wherein said step of generating includes generating square waves having a center frequency of substantially 40 kHz and a band of substantially 6 kHz.

5. A method as set forth in claim 1, further comprising the step of generating sound from said audio signals.

6. An ultrasonic binaural sensory aid for detecting the position of objects, comprising:
    means for radiating an ultrasonic signal over an area comprising a field of view;
    means for receiving signals reflected from objects within said field of view;
    means for amplifying the received signals;
    means for detecting the envelope of the amplified signals;
    means for stretching the time axis of the detected envelopes; and
    means for modulating the stretched detected envelopes with pseudo noise to generate audio signals representative of said objects in said field of view.

7. An ultrasonic binaural sensory aid as set forth in claim 6, further comprising time gain control means for adjusting the gain of said amplifying means proportional to the reflected signal arrival time to compensate for far field objects.

8. An ultrasonic binaural sensory aid as set forth in claim 6, wherein said means for stretching includes a real time clock and a time extended clock to stretch the time axis of the detected envelopes.

9. An ultrasonic binaural sensory aid as set forth in claim 6, wherein said means for transmitting includes an oscillator for generating square waves having a center frequency of substantially 40 kHz and band of substantially 6 kHz.

10. An ultrasonic binaural sensory aid as set forth in claim 6, further comprising means for converting said audio signals into sound.

* * * * *